W. C. MEAD.
HANDLE OF CYCLES.
APPLICATION FILED MAR. 14, 1908.
909,633.
Patented Jan. 12, 1909.
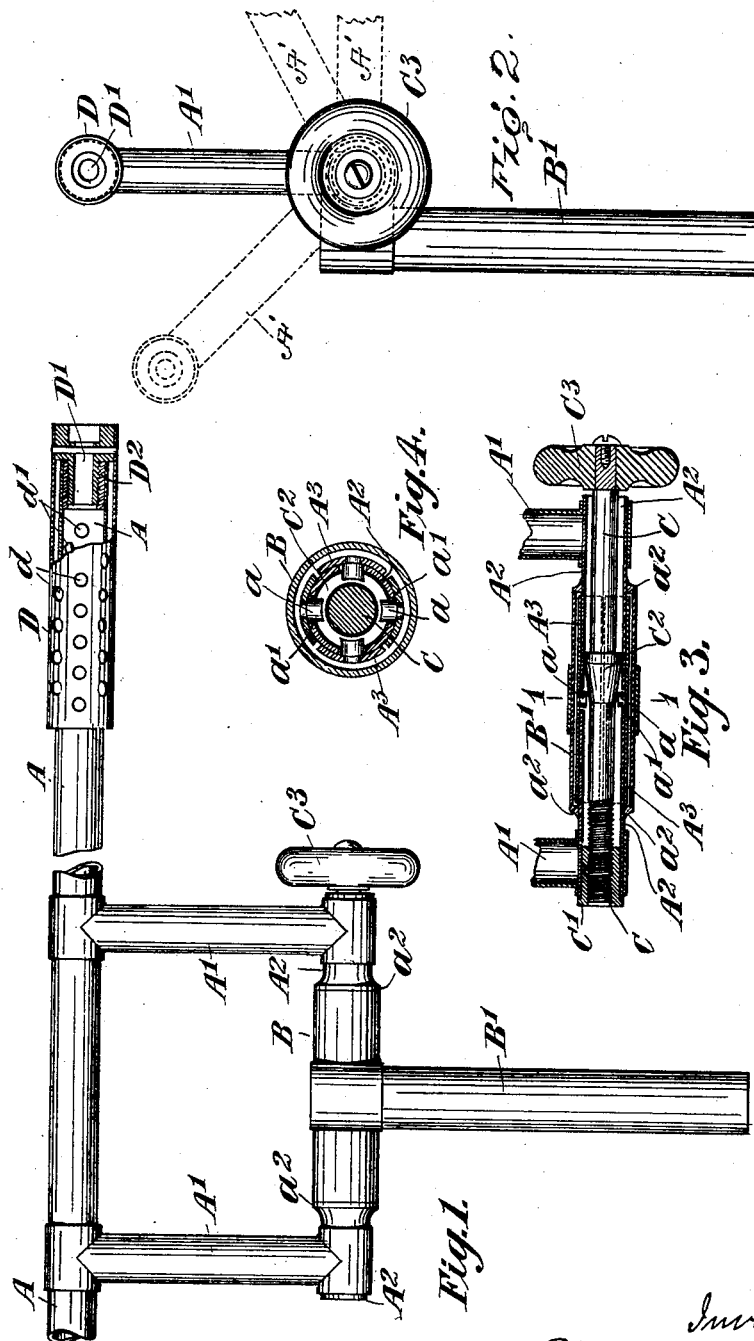
Witnesses:
E. R. Peck
W. A. Williams
Inventor:
Walter C. Mead
per Hubert E. Peck
atty

UNITED STATES PATENT OFFICE.

WALTER CARDIFF MEAD, OF MALDON, VICTORIA, AUSTRALIA.

HANDLE OF CYCLES.

No. 909,633.  Specification of Letters Patent.  Patented Jan. 12, 1909.

Application filed March 14, 1908. Serial No. 421,213.

*To all whom it may concern:*

Be it known that I, WALTER CARDIFF MEAD, a subject of the King of Great Britain and Ireland, residing at High street, Maldon, in the State of Victoria, Commonwealth of Australia, have invented certain new and useful Improvements in the Handles of Cycles, of which the following is a specification.

This invention relates to an improved adjustable handle bar for cycles and which is so constructed that the position of the handles may be adjusted radially to the desired height most convenient to the rider. The handle bar according to this invention is preferably constructed of a straight tube, made in one length, and supported above the ordinary handle bar pillar by tubular posts which spring from a shorter longitudinal tube which is supported by another tube secured to the top portion of said handle bar pillar and capable of being oscillated therein. Said handle bar is locked at the desired height or position by means of a screwed friction clutch of novel construction having one end furnished with a handle or hand wheel, also the handle bar is furnished at both ends with a novel construction of grip handle.

The invention will now be fully described aided by a reference to the accompanying sheet of drawings in which:—

Figure 1 is a front view and Fig. 2 a side view of my improved adjustable handle bar as fitted to an ordinary handle bar pillar. Fig. 3 is a central longitudinal section showing the friction clutch locking appliance and Fig. 4 a vertical section on line 1—1 Fig. 3.

In constructing my invention the handle bar proper is formed of a straight tubular bar A rigidly connected on each side of its center to one end of a tubular post $A^1$ the other ends of which are rigidly connected to a tube $A^2$ which passes through the T piece B of the handle bar pillar $B^1$, while about the outer surface of the tube $A^2$ is a tube $A^3$ which is cut into either two, three, or four sections and each section has a projecting stud $a$ which passes through a hole $a^1$ formed in the tube $A^2$. Inside the inner tube $A^2$ is a rod C which is screw-threaded at one end to take into a nipple $C^1$ secured to the inner tube $A^2$ which has secured on it outside collars $a^2$ which prevent the lateral traverse of the clutch sections $A^3$ when the clutch is free. Said rod C near its center is furnished with a cone piece $C^2$ which is designed to bear against the studs $a$ and force them outwards when the rod C is screwed in the proper direction by the hand wheel $C^3$ and thus cause the divided tube $A^3$ to bear hard against the inside surface of the horizontal barrel of the T piece B of handle bar pillar $B^1$. By turning the hand wheel $C^3$ in the opposite direction the cone piece $C^2$ is withdrawn from under the studs $a$ and allows the handle bar A freedom to be adjusted to any position to suit the rider, as shown by the dotted lines in Fig. 2.

Each end of the handle bar A is furnished with a perforated tubular grip piece D which is of a slightly larger diameter than said handle bar A and is secured thereon by means of a reducing nipple $D^1$ which is suitably secured in the end of said grip piece D and the reduced portion of said nipple $D^1$ screwed into a nipple $D^2$ secured in the end of the handle bar A. Said grip piece D is provided with a number of perforations $d$ while the handle bar A is also perforated at $d^1$ to allow a current of air to pass through the said handle grip D to keep same cool. If desired the handle grip D may be covered with leather or the like for warmth in winter.

Having now described my invention what I claim as new and desire to secure by Letters Patent is:—

1. An adjustable handle bar for cycles comprising a handle bar pillar having a hollow cross head, a handle bar, a tube parallel therewith and passing through said head and adapted to turn therein, rigid radial connections between said tube and said bar, and manually operative clutch mechanism within said head for locking said tube therein against turning and whereby said tube can be released to permit adjustment of the handle bar around said head as a center, substantially as described.

2. An adjustable handle bar for cycles comprising a transverse tubular portion, a member passing therethrough and adapted to turn therein, a handle bar spaced a distance from said member and having rigid radial connection therewith, whereby as said member turns in said tubular portion said handle bar swings from the same as a center, and clutch mechanism arranged in said tubular portion for locking said member therein against turning, said mechanism having an exterior operating handle arranged adjacent an end of said member.

3. An adjustable handle bar for cycles comprising a tubular portion adapted to be fixed to a cycle frame, a handle bar, a tubular member passing through and adapted to turn in said portion, a longitudinally adjustable cone in said member provided with means whereby the same can be adjusted from the exterior of said member, and an expanding clutch mechanism within said portion and adapted to be expanded by said cone to lock said member to said portion against turning therein.

4. An adjustable handle bar for cycles comprising a tubular portion adapted to be secured to a cycle frame, a handle bar provided with a hollow member extending into and adapted to turn in said portion as the handle bar is adjusted, an expanding clutch within said tubular portion and at the exterior of said member and provided with portions projecting into said member, and a cone within said member provided with exterior operating means and adapted to engage said portions and expand such clutch to lock said member to said tubular portion, substantially as described.

5. An adjustable handle bar for cycles comprising a tubular portion adapted to be secured to a cycle frame, a handle bar having a hollow member adapted to turn in said portion, an expansible clutch within said portion and at the exterior of said member and provided with studs projecting into said member, and a longitudinally adjustable rod having exterior operating means and means within said member for engaging said studs and expanding said clutch to lock the member and portion together.

In testimony whereof I have hereunto set my hand in presence of two subscribing witnesses.

WALTER CARDIFF MEAD.

Witnesses:
  BEDLINGTON BODYCOMB,
  W. J. S. THOMPSON.